United States Patent
Damiano

(10) Patent No.: US 8,383,217 B2
(45) Date of Patent: Feb. 26, 2013

(54) CORROSION INHIBITING PROTECTIVE SLEEVES

(75) Inventor: Frank Damiano, Woodbridge (CA)

(73) Assignee: Integrated Marketing Solutions, Woodbridge, Ontario (CA)

( * ) Notice: Subject to any disclaimer, the term of this patent is extended or adjusted under 35 U.S.C. 154(b) by 494 days.

(21) Appl. No.: 10/970,618

(22) Filed: Oct. 21, 2004

(65) Prior Publication Data

US 2005/0118375 A1 Jun. 2, 2005

Related U.S. Application Data

(60) Provisional application No. 60/512,756, filed on Oct. 21, 2003.

(51) Int. Cl.
*B32B 1/02* (2006.01)
*B32B 1/08* (2006.01)
*B32B 23/00* (2006.01)

(52) U.S. Cl. ............ 428/36.1; 428/34.1; 428/34.2; 428/35.7; 428/35.9; 428/36.9; 428/36.91

(58) Field of Classification Search ............ 428/34.1, 428/34.2, 35.7, 35.9, 36.9, 36.91, 36.1
See application file for complete search history.

(56) References Cited

U.S. PATENT DOCUMENTS

| 2,643,176 | A | * | 6/1953 | Wachter et al. | 162/160 |
| 2,710,388 | A | * | 6/1955 | Chun | 367/115 |
| 5,422,187 | A | * | 6/1995 | Miksic et al. | 428/545 |
| 6,033,599 | A | * | 3/2000 | Lozano et al. | 252/389.54 |
| 2003/0049986 | A1 | * | 3/2003 | Qureshi et al. | 442/221 |

FOREIGN PATENT DOCUMENTS

| GB | 1209659 | * | 7/1968 |
| GB | 2294104 | * | 4/1996 |

OTHER PUBLICATIONS

Merriam—Websters Collegiate Dictionary, Tenth Edition, p. 1103 (1999).*
V80 VCI Oil Blend, Inhibitor Premium VCI Technology, (2 p.).
Daubert Cromwell Material Safety Data Sheet (3 p.).
VCI 2000 Material Safety Data Sheet (5 p.).
The Cortec Corporation, VPCI 325 Material Safety Data Sheet (1 p.).
The Cortec Corporation, VCI Metalworking Products, VCI 325 (2 p.).
The Cortec Corporation, VpCI Metalworking Products, VpCI 325 (2 p.).

* cited by examiner

*Primary Examiner* — Marc Patterson
(74) *Attorney, Agent, or Firm* — Conley Rose, P.C.

(57) ABSTRACT

A corrosion inhibiting protective sleeve formed of a woven fabric material and impregnated with a vapor-phase corrosion inhibitor (VpCI).

20 Claims, 3 Drawing Sheets

CORROSION INHIBITING PROTECTIVE SLEEVES

CROSS-REFERENCE TO RELATED APPLICATIONS

This application claims priority from U.S. Provisional Application No. 60/512,756, filed Oct. 21, 2003, which is pending.

STATEMENT REGARDING FEDERALLY SPONSORED RESEARCH OR DEVELOPMENT

Not Applicable.

FIELD OF THE INVENTION

The present invention relates to protective sleeves, and more particularly to corrosion inhibiting protective sleeves.

BACKGROUND OF THE INVENTION

Corrosion is a problem for many metal products, including fabricated or machined parts and guns, in addition to many other products. It is often desirable to provide a protective sleeve, sheath or similar cover to prolong the life of such products for reducing exposure to corrosive elements and other environments that may otherwise damage or shorten product life.

Gun carriers are used to store and transport guns. One drawback of gun carriers is that the walls of the carrier are solid and impermeable to moisture. As a result, any moisture or water vapour in the carrier becomes trapped in the carrier when the gun is enclosed in it.

Fabric sleeves or socks are another type of protective sleeve. Fabric sleeves are advantageous because of the ease with which they can be pulled over/off an item to be protected, and can be adapted for items of different sizes and shapes. Typical fabric sleeves protect against dust and dirt, but trap moisture and accelerate rust and corrosion of metal objects inside. A known method for inhibiting corrosion of metal objects is to treat the sleeves with silicone. Silicone within the sleeves absorbs trapped moisture reducing the amount of free water vapour in the sleeve. A disadvantage of silicone-treated sleeves is that silicone on the metal surfaces can trap water vapour on the metal surfaces and cause localized corrosion to occur. A further disadvantage is that water vapour trapped in the sleeve is free to condense onto metal surfaces, for example in response to changes in temperature.

Thus, there remains a need for an improved protective fabric sleeve which can inhibit corrosion of metal objects contained inside.

SUMMARY OF THE INVENTION

The present invention is a protective fabric sleeve which is treated with a vapour-phase corrosion inhibitor to protect metal objects received therein.

In accordance with one aspect of the present invention, there is provided a corrosion inhibiting protective sleeve, comprising an elongate sleeve formed of a woven fabric material impregnated with a vapour-phase corrosion inhibitor (VpCI).

In accordance with another aspect of the present invention, there is provided a corrosion inhibiting protective sleeve for protecting a metal object received therein, comprising: a fiber matrix including fibers, the fiber matrix defining interstices between the fibers; and a vapour-phase corrosion inhibitor (VpCI) received in at least some of the interstices.

In accordance with a further aspect of the present invention, there is provided a method for manufacturing a corrosion inhibiting protective sleeve, the protective sleeve being used to protect a metal object received therein, comprising the steps of: forming an elongate sleeve including a fiber matrix comprising fibers, the fiber matrix defining interstices between the fibers; and impregnating the fiber matrix with a vapour-phase corrosion inhibitor (VpCI).

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings which show, by way of example, embodiments of the present invention, and in which.

Similar references are used in different figures to denote similar components.

DETAILED DESCRIPTION

Figure 1:
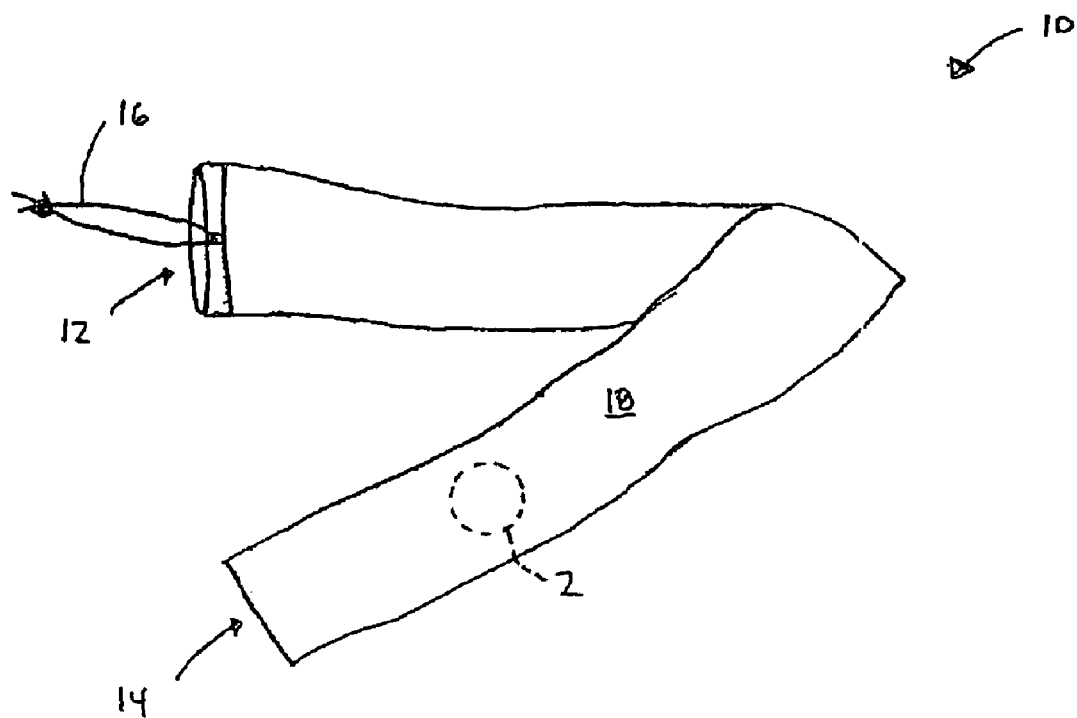
FIG. 1 is a perspective view of one embodiment of a corrosion inhibiting protective sleeve according to the present invention.

Reference is first made to FIG. 1, which shows a fabric sleeve 10 according to one embodiment of the present invention. The fabric sleeve 10 has an open end 12 and a closed end 14. A drawstring 16 allows the opening of the open end 12 to be opened or closed by its tightening or loosening. The fabric sleeve 10 is made of a woven fabric material selected from a variety of suitable materials, including cotton, polyester, and polyester/cotton blends. In one embodiment, the fabric sleeve 10 is formed using a tubular knit. Other suitable types of knitting may be used in the manufacturing of the fabric sleeve 10, if desired. In some embodiments, the drawstring 16 is replaced by a zipper at the open end 12 which may optionally extend along the length of one side of the fabric sleeve 10 providing easier access to the interior. The seams of the fabric sleeve 10 may be sewn and glued for extra strength. The exterior surface of the fabric sleeve 10 may include an imprint area for receiving indicia such as a corporate logo or name, or other information.

Figure 2:
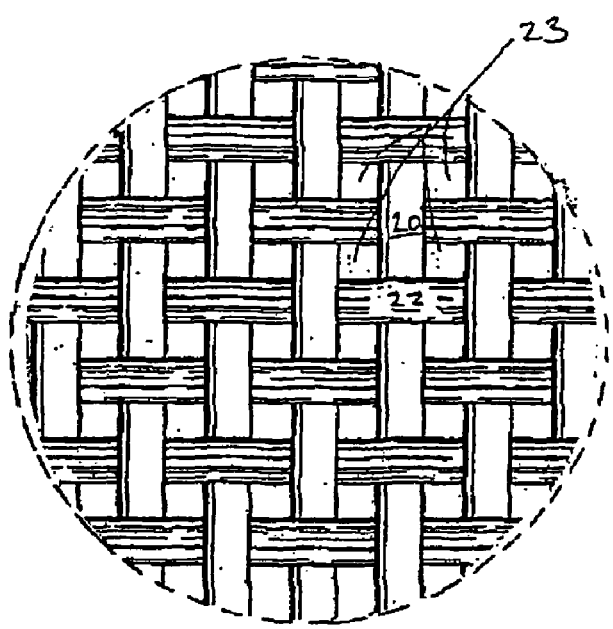
FIG. 2 is an exploded view of the fiber matrix of the protective sleeve of FIG. 1.

Referring now to FIG. 2, a fiber matrix 18 of the fabric sleeve 10 will be described. The fiber matrix 18 includes a set of first fibers 20 oriented in one direction interwoven with a set of second fibers 22 oriented in a second direction different from the first direction. The fiber matrix 18 defines spaces or interstices 23 between the fibers 20 and 22. In one embodiment, the fibers 20 and 22 are made of different materials. In another embodiment, the fibers 20 and 22 are made of the same material. In some embodiments, there may be additional fiber sets. In other embodiments, the fibers in a given fiber set may be made more than one type of material. Differences in the fiber materials and the number of fiber sets provides for the physical properties, for example strength and durability, and the appearance of the fabric sleeve 10 to be customized. The colour of the fibers may also be varied to fit the particular application of the fabric sleeve 10 or to suit the preferences of the user of the fabric sleeve 10. It will be appreciated by one of skill in the art that the present invention is not limited to any particular fiber material, pattern of weaving or knitting of the fibers.

The fabric sleeve 10 is treated with a vapour-phase corrosion inhibitor (VpCI), sometimes referred to as a vapour or volatile corrosion inhibitor (VCI). An example VpCI composition that can be used to treat the fabric sleeve 10 is the VCI-325 product from the Cortec Corporation (St. Paul, Minn., USA). Other VpCI formulations by the same or other suppliers may be used, for example the VCI 2000™ product from Daubert VCI, Inc. (Knox, Ind., USA) or The Inhibitor product form Van Patten Industries (Rockford, Ill., USA). Examples of VpCI compounds are taught in U.S. Pat. Nos. 5,854,145, 5,422,187, and 5,139,700. The fabric sleeve 10 may be treated with VpCI in several different ways. One method of treating the fabric sleeve 10 is to immerse it in a slurry or solution containing VpCI. In some embodiments, the VpCI solution is an oil-based formulation. In other embodiments, the VpCI solution is a water-based formulation. When immersed in the VpCI solution, the fabric sleeve 10 absorbs the VpCI into the fiber matrix 18 and is received in the interstices 23 (VpCI not shown). The fabric sleeve 10 may be immersed in the VpCI solution by dipping or drawing the sleeve 10 through a bath or tank containing the solution. The fabric sleeve 10 may also be treated by spraying or brushing with the VpCI solution. Other methods of treatment are also possible. The duration of treatment, among other factors, determines the amount of VpCI that is received in the interstices 23. For a given VpCI formulation and method of treatment, the treatment duration is selected so that an effective amount of VpCI is received in the interstices 23. The effective amount varies depending on the particular application of the fabric sleeve 10. Following treatment, the fiber matrix 18 is infused or impregnated with VpCI. The impregnated fabric matrix will slowly release VpCI from the fabric matrix 18 and protect the metal surfaces of the object received in the fabric sleeve 10.

Figure 3:
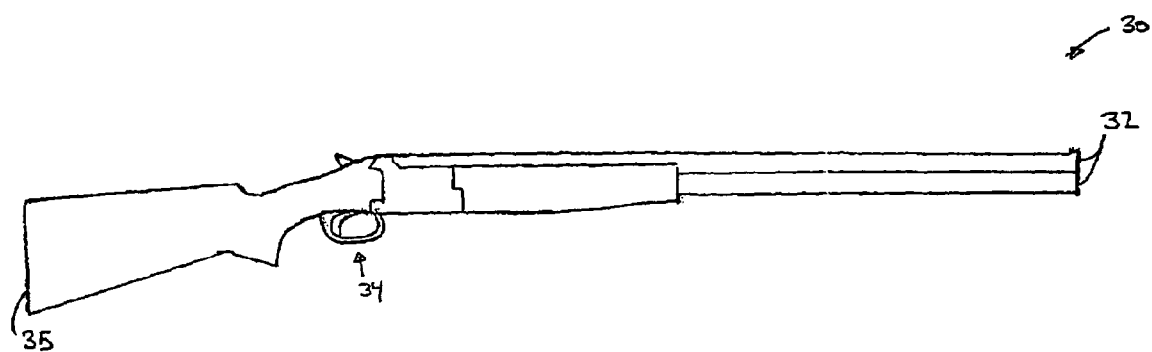
FIG. 3 is a side view of a shotgun that can be used with the protective sleeve of FIG. 1.
Figure 4:
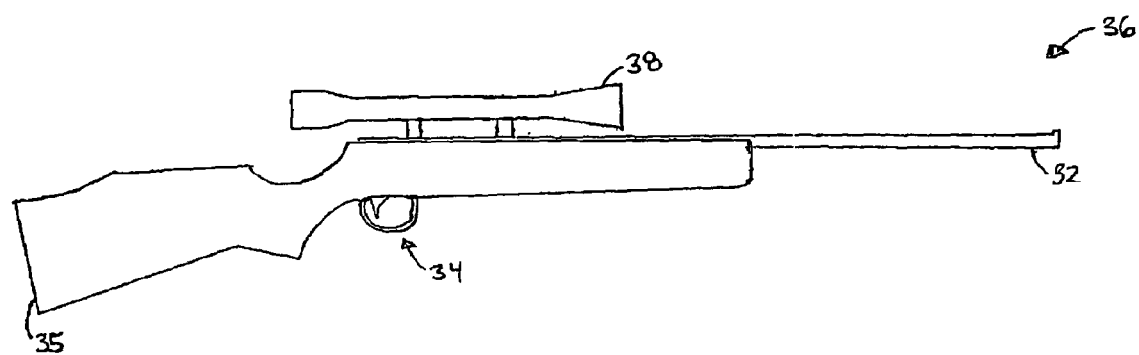
FIG. 4 is a side view of a rifle that can be used with the protective sleeve of FIG. 1.

Reference is now made to FIGS. 3 and 4, which show respectively a shotgun 30 and a rifle 36 with which the present invention may be utilized. Fabric sleeves used for this purpose are sometimes referred to as gun socks. Other guns such as antique guns, black powder guns, and handguns can also be used with a fabric sleeve constructed according to the present invention. The shotgun 30 has a set of barrels 32, trigger 34, butt end 35 and other metallic components. Similarly, the rifle 36 has a barrel 32, a trigger 34, and butt end 35. The rifle 36 is also equipped with a scope 38. Either of the shotgun 30 or rifle 36 may be used with the fabric sleeve 10. In one embodiment, the fabric sleeve 10 has a length of approximately 52" and is used to protect a standard size rifle. In another embodiment, the fabric sleeve has a length of approximately 13.5" and is used to protect a pistol or handgun. In some embodiments, the fabric sleeve 10 has as stretched diameter of 10", large enough to accommodate almost any gun, rifle or shotgun, scoped or unscoped. Other lengths and sizes are also possible.

Figure 5:
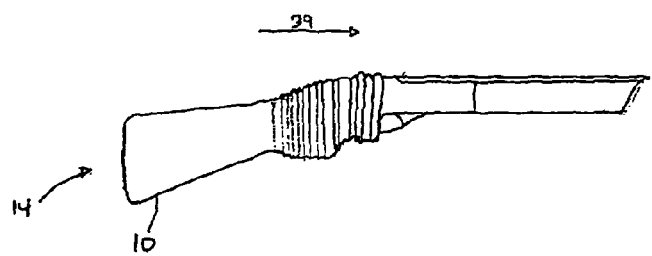
FIG. 5 is a partial side view of the protective sleeve of FIG. 1 partially pulled over the shotgun of FIG. 3.
Figure 6:
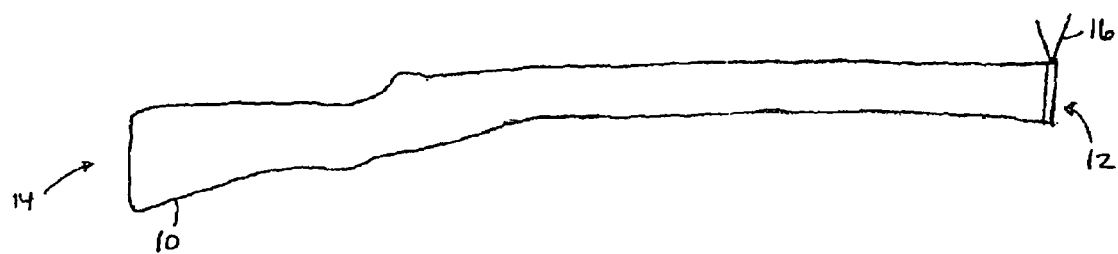
FIG. 6 is a side view of the protective sleeve of FIG. 1 fully pulled over the shotgun of FIG. 3.

Referring now to FIGS. 5 and 6, a method of using the shotgun 30 with the fabric sleeve 10 will now be explained. If the shotgun 30 is wet, surface moisture should be removed by, for example, wiping with a cloth. In the first step, the drawstring 16 of the fabric sleeve 10 is loosened to expand the open end 12. Next, the fabric sleeve 10 is crumpled to reduce its length, and form a series of folds in the sleeve 10. The butt end 35 is then introduced into the fabric sleeve 10. The fabric sleeve 10 is then expanded and stretched in the direction 39 towards the barrels 32 of the shotgun 30 so that it is entirely protected by the fabric sleeve 10. The drawstring 16 may then be tightened to narrow or close the opening in the open end 12. If desired, the covered shotgun 30 may then be placed in a gun case, gun bag, or other gun carrier. To remove the shotgun 30 from the fabric sleeve 10, the foregoing process is reversed. It will be appreciated by one of skill in the art that the method of using the fabric sleeve 10 is not intended as a limitation of the present invention, and the process may be varied without departing from the scope of the present invention, for example the barrels 32 may be first introduced into the fabric sleeve 10.

When covered by the fabric sleeve 10, the shotgun 30 is protected from corrosion by the VpCI impregnated in the fiber matrix 18. The VpCI impregnated in the fiber matrix 18 evapourates and forms a vapour which migrates throughout the interior of the fabric sleeve 10 and penetrates most cracks, cavities, and recesses in the shotgun 30. Protective ions of the VpCI are attracted to metal and form a thin, monomolecular layer on the metal surfaces of the shotgun 30. The protective monolayer prevents or reduces water vapour, salt, oxygen, dust, dirt, and other materials from contacting the metal surfaces of the shotgun 30, thereby inhibiting rust and corrosion. The fabric sleeve 10 also protects against surface scratches.

VpCI impregnated in the fiber matrix 18 establishes an equilibrium with the VpCI in the vapour phase. The VpCI draws or wicks moisture away from the metal surfaces of the shotgun 30. As the protective monolayer is depleted, more VpCI condenses to replenish the protective layer. VpCI impregnated in the fiber matrix 18 then evaporates to make up for that which was lost from the vapour phase. In this manner, the VpCI treated fabric sleeve 10 provides self-replenishing corrosion inhibiting action that is particularly advantageous for protective storage or transportation of metal objects.

The use of a woven material, in particular, a tubular knit in association with the VpCI is particularly advantageous because moisture is not trapped inside the fabric, but is allowed to dissipate, drip or evapourate out, while any remaining or entering moisture is rendered harmless by the VpCI.

It will be appreciated by those of skill in the art that the present invention is not limited to fabric sleeves or socks for guns. The present invention may also be used to protect golf clubs, hand tools such as hammers, and other metal products which may be prone to or suffer from corrosion. The present invention may also be used in tool pouches and belts, golf bags, and as a lining in tool chests and fishing tackle boxes. The present invention is useful for the storage of metal products and the transportation of such products, particularly in cases where the transported goods may experience significant changes in temperature and/or humidity. When used in association with smaller metal objects such as handguns or hammers, the length of the fabric sleeve may be shortened to avoid or reduce any excess or unused portion of the sleeve.

Although the present invention has been described with reference to illustrative embodiments, it is to be understood that the invention is not limited to these precise embodiments, and that various changes and modifications may be effected therein by one skilled in the art. All such changes and modifications are intention to be encompassed in the appended claims.

What is claimed is:

1. A corrosion inhibiting protective sleeve including a woven fabric material, wherein said woven fabric material is knit to include loops and wherein the loops are impregnated with a vapour-phase corrosion inhibitor (VpCI), said woven fabric material including interstices allowing transmission of moisture through said material and said sleeve being permeable regarding the transmission of moisture through the sleeve and lacking any moisture barrier layers.

2. A corrosion inhibiting protective tubular sleeve, said sleeve for protecting a metal object received therein, comprising:
   a fiber matrix formed into a tubular knit;
   said fiber matrix including a plurality of fibers, said fiber matrix defining interstices between said fibers allowing transmission of moisture through said fiber matrix;
   a vapour-phase corrosion inhibitor (VpCI) received in at least some of said interstices in an effective amount to inhibit corrosion of the metal object; and
   said sleeve being permeable regarding the transmission of moisture through the sleeve and lacking any moisture barrier layers.

3. The protective sleeve as claimed in claim 2, wherein the VpCI is received in said interstices in an effective amount to substantially inhibit corrosion of the metal object for a continuous period of at least 2 years from the when the metal object is introduced into said sleeve.

4. The protective sleeve as claimed in claim 2, wherein the VpCI is a liquid.

5. The protective sleeve as claimed in claim 2, wherein the VpCI is a solid.

6. The protective sleeve as claimed in claim 4, wherein the VpCI is a water-based liquid.

7. The protective sleeve as claimed in claim 4, wherein the VpCI is an oil-based liquid.

8. A method for manufacturing the corrosion inhibiting protective tubular sleeve of claim 2, including:
   forming said tubular knit including said fiber matrix; and
   impregnating the fiber matrix with the vapour-phase corrosion inhibitor (VpCI) to inhibit corrosion of the metal object.

9. The method as claimed in claim 8, wherein impregnating the fiber matrix further includes:
   introducing the sleeve into a solution of the VpCI; and
   maintaining the sleeve within the solution of the VpCI until the interstices of the fiber matrix have received therein an effective amount of the VpCI to inhibit corrosion of the metal object received therein.

10. The method as claimed in claim 9, wherein the solution of VpCI is water-based.

11. The method as claimed in claim 9, wherein the solution of VpCI is oil-based.

12. The method as claimed in claim 9, wherein the sleeve is dipped into a bath of the VpCI solution.

13. The method as claimed in claim 9, wherein the sleeve is drawn through a bath of the VpCI solution.

14. The method as claimed in claim 8, wherein forming the tubular knit is performed subsequent to impregnating the fiber matrix.

15. The method as claimed in claim 8, wherein impregnating the fiber matrix is performed subsequent to forming the tubular knit.

16. The protective sleeve as claimed in claim 2, wherein the metal object can be secured therein without straps or banding material.

17. The protective sleeve as claimed in claim 1, wherein an open end can be sealed.

18. The protective sleeve as claimed in claim 1, wherein the fabric material is polyester.

19. The method as claimed in claim 8, wherein the plurality of fibers is knit to include loops and further including impregnating the fiber matrix with the vapour-phase corrosion inhibitor (VpCI) so as to be received in the loops.

20. The method as claimed in claim 19, wherein the plurality of fibers is polyester.

* * * * *